United States Patent
Pai et al.

(10) Patent No.: US 9,316,758 B2
(45) Date of Patent: Apr. 19, 2016

(54) EARTH SURVEYING FOR IMPROVED DRILLING APPLICATIONS

(71) Applicant: Liquid Robotics Oil and Gas LLC, Houston, TX (US)

(72) Inventors: Sudhir Pai, Houston, TX (US); Benny Poedjono, Sugar Land, TX (US); Graham Lancaster Hine, Los Gatos, CA (US)

(73) Assignee: LIQUID ROBOTICS OIL AND GAS LLC, Houston, TX (US)

(*) Notice: Subject to any disclaimer, the term of this patent is extended or adjusted under 35 U.S.C. 154(b) by 79 days.

(21) Appl. No.: 14/024,935

(22) Filed: Sep. 12, 2013

(65) Prior Publication Data

US 2014/0354284 A1 Dec. 4, 2014

Related U.S. Application Data

(60) Provisional application No. 61/828,584, filed on May 29, 2013.

(51) Int. Cl.
*G01V 3/165* (2006.01)

(52) U.S. Cl.
CPC .................................... *G01V 3/165* (2013.01)

(58) Field of Classification Search
None
See application file for complete search history.

(56) References Cited

U.S. PATENT DOCUMENTS

| | | | | | |
|---|---|---|---|---|---|
| 3,263,161 | A | * | 7/1966 | Ruddock | G01V 3/087 324/331 |
| 3,490,032 | A | * | 1/1970 | Zurflueh | G01R 33/025 324/331 |
| 3,943,436 | A | * | 3/1976 | Pirson | G01V 3/082 324/345 |
| 4,072,200 | A | * | 2/1978 | Morris | E21B 7/04 175/45 |
| 4,404,664 | A | * | 9/1983 | Zachariadis | B63G 8/42 114/246 |
| 4,485,345 | A | * | 11/1984 | Anderson | G01V 3/15 324/345 |
| 4,502,010 | A | * | 2/1985 | Kuckes | G01V 3/26 324/247 |
| 4,593,770 | A | * | 6/1986 | Hoehn, Jr. | E21B 47/02 166/66.5 |
| 4,739,262 | A | * | 4/1988 | Fleetwood | G01V 3/40 324/244 |
| 4,777,819 | A | * | 10/1988 | Hoyt | B63B 22/003 441/2 |
| 5,012,675 | A | * | 5/1991 | Koller | G01V 11/00 73/432.1 |
| 5,064,006 | A | * | 11/1991 | Waters | E21B 7/068 175/45 |
| 5,230,387 | A | * | 7/1993 | Waters | E21B 7/068 175/45 |
| 5,321,893 | A | * | 6/1994 | Engebretson | E21B 47/022 33/304 |
| 5,444,374 | A | * | 8/1995 | Stanley | G01V 3/15 324/334 |
| 5,512,830 | A | * | 4/1996 | Kuckes | E21B 47/00 324/346 |

(Continued)

OTHER PUBLICATIONS

Poedjono, B., et al Successful Application of Geomagnetic Referencing for Accurate Wellbore Positioning in Deepwater Project Offshore Brazil. Society of Petroleum Engineers.; http://dx.doi.org/10.2118/150107-MS; ISBN 978-1-61399-186-2; IADC/SPE Drilling conference and Exhibition, Mar. 6-8, 2012 San Diego, CA USA, attached as PDF Document.*

(Continued)

*Primary Examiner* — Patrick Assouad
*Assistant Examiner* — Suresh K Rajaputra
(74) *Attorney, Agent, or Firm* — Norton Rose Fulbright US LLP

(57) ABSTRACT

Methods and apparatuses for geophysical surveying are disclosed. In one embodiment, a marine vehicle may obtain magnetic measurements in a location around a drilling site. The magnetic measurements may be used to calculate a localized disturbance magnetic field resulting from, for example, solar flares. The localized disturbance magnetic field may be used to calculate a declination value and, thus, a wellbore position with improved accuracy.

19 Claims, 2 Drawing Sheets

(56) References Cited

U.S. PATENT DOCUMENTS

| | | | | | |
|---|---|---|---|---|---|
| 5,543,714 | A * | 8/1996 | Blanpain | G01V 3/40 | 324/323 |
| 5,563,513 | A * | 10/1996 | Tasci | G01V 3/08 | 324/359 |
| 5,850,624 | A * | 12/1998 | Gard | G01R 33/0206 | 33/356 |
| 5,960,370 | A * | 9/1999 | Towle | G01V 3/26 | 702/7 |
| 6,021,577 | A * | 2/2000 | Shiells | E21B 47/022 | 175/45 |
| 6,145,378 | A * | 11/2000 | McRobbie | E21B 47/00 | 166/254.1 |
| 6,212,476 | B1 * | 4/2001 | Noy | E21B 47/022 | 324/345 |
| 6,347,282 | B2 * | 2/2002 | Estes | G01V 1/40 | 702/6 |
| 6,765,383 | B1 * | 7/2004 | Barringer | G01V 3/16 | 324/330 |
| 6,885,942 | B2 * | 4/2005 | Shray | G01V 11/00 | 702/11 |
| 6,977,505 | B1 * | 12/2005 | Rosenquist | G01V 3/15 | 324/345 |
| 7,002,350 | B1 * | 2/2006 | Barringer | G01V 3/083 | 324/350 |
| 7,054,753 | B1 * | 5/2006 | Williams | G01V 11/00 | 702/13 |
| 7,405,563 | B2 * | 7/2008 | Kruspe | E21B 47/022 | 324/300 |
| 7,730,967 | B2 * | 6/2010 | Ballantyne | E21B 47/12 | 175/40 |
| 8,095,317 | B2 * | 1/2012 | Ekseth | E21B 47/022 | 702/7 |
| 8,185,312 | B2 * | 5/2012 | Ekseth | E21B 7/067 | 702/7 |
| 8,280,638 | B2 * | 10/2012 | Brooks | G01V 11/00 | 702/151 |
| 8,386,059 | B2 * | 2/2013 | Boone | G05B 15/02 | 166/250.01 |
| 8,433,519 | B2 * | 4/2013 | Ekseth | E21B 47/022 | 702/7 |
| 2001/0041963 | A1 * | 11/2001 | Estes | G01C 19/38 | 702/6 |
| 2002/0116130 | A1 * | 8/2002 | Estes | G01C 19/38 | 702/9 |
| 2003/0074139 | A1 * | 4/2003 | Poedjono | G01V 1/34 | 702/16 |
| 2005/0020156 | A1 * | 1/2005 | Price | A01M 29/06 | 441/136 |
| 2005/0077902 | A1 * | 4/2005 | MacGregor | G01V 3/12 | 324/334 |
| 2005/0199425 | A1 * | 9/2005 | Estes | E21B 47/024 | 175/50 |
| 2005/0285598 | A1 * | 12/2005 | Barringer | G01V 3/17 | 324/330 |
| 2006/0124360 | A1 * | 6/2006 | Lee | E21B 43/305 | 175/61 |
| 2006/0247857 | A1 * | 11/2006 | Zeng | G01V 3/38 | 702/2 |
| 2007/0051292 | A1 * | 3/2007 | Kilbourn | B63B 35/00 | 114/311 |
| 2008/0008035 | A1 * | 1/2008 | Smith | G01V 3/083 | 367/20 |
| 2009/0084546 | A1 * | 4/2009 | Ekseth | E21B 47/04 | 166/255.1 |
| 2009/0141587 | A1 * | 6/2009 | Welker | G01V 1/3817 | 367/16 |
| 2010/0038079 | A1 * | 2/2010 | Greenaway | E21B 47/0007 | 166/254.2 |
| 2010/0096186 | A1 * | 4/2010 | Ekseth | E21B 7/067 | 175/45 |
| 2010/0100329 | A1 * | 4/2010 | Ekseth | E21B 47/022 | 702/7 |
| 2010/0102809 | A1 * | 4/2010 | May | G01V 3/081 | 324/244 |
| 2010/0152901 | A1 * | 6/2010 | Judge | E21B 33/062 | 700/275 |
| 2010/0211318 | A1 * | 8/2010 | Brooks | G01V 11/00 | 702/9 |
| 2010/0231220 | A1 * | 9/2010 | Alumbaugh | E21B 7/04 | 324/338 |
| 2011/0080806 | A1 * | 4/2011 | Normann | G01V 1/46 | 367/35 |
| 2012/0001101 | A1 * | 1/2012 | Dietz | E21B 33/062 | 251/1.3 |
| 2012/0134234 | A1 * | 5/2012 | Roberts | G01V 1/003 | 367/19 |
| 2012/0217023 | A1 * | 8/2012 | Chau | E21B 47/02224 | 166/380 |
| 2012/0218863 | A1 * | 8/2012 | Chau | E21B 47/12 | 367/82 |
| 2012/0262179 | A1 * | 10/2012 | Whan | G01V 11/00 | 324/345 |
| 2013/0002257 | A1 * | 1/2013 | McElhinney | E21B 47/02224 | 324/346 |
| 2013/0179108 | A1 * | 7/2013 | Joseph | G01D 18/00 | 702/104 |
| 2014/0052687 | A1 * | 2/2014 | Davidoff | G06N 7/005 | 706/52 |
| 2014/0081574 | A1 * | 3/2014 | Hove | E21B 47/022 | 702/6 |
| 2014/0166264 | A1 * | 6/2014 | Judge | E21B 33/062 | 166/66 |
| 2014/0208843 | A1 * | 7/2014 | Godfrey | E21B 43/119 | 73/152.58 |
| 2014/0354284 | A1 * | 12/2014 | Pai et al. | | 324/345 |
| 2014/0377872 | A1 * | 12/2014 | Brosse et al. | | 436/29 |

OTHER PUBLICATIONS

Intermagnet_Technical Reference Manual_Version 4.6 (2012), Edited by: Benoit St-Louis; [retrieved on Jan. 30, 2015], attached as a PDF document.*

Wayback Machine—www.intermagnet.org, archived record from Jun. 23, 1998; [accesed on Feb. 4, 2015], attached as a PDF document.*

Petrology of Sedimentary Rocks by Robert L. Folk, 1974, p. 1, Hemphill Publishing Company, Austin, Texas, Library of Congress Catalog Card No. 80-83557, ISBN No. 0-914696-14-9, selected p. 1 and title page attached.*

Marine Magnetics, "Explorer Mini Marine Magnetometer", www.marinemagnetics.com.

Poedjono et al., "Geomagnetic Referencing in the Arctic Environment", Society of Petroleum Engineers, 2011, SPE-149629-PP, pp. 1-13.

Liquid Robotics, "Ocean robots embark on final stage of Pacific Crossing (PacX) collecting unprecedented amounts of ocean data, Helping Fost Interest in Science Education and Ocean Exploration", May 21, 2012.

Poedjono et al., "Geomagnetic Referencing Service—A Viable Alternative for Accurate Wellbore Surveying", IADC/SPE 127753-PP, 2010, pp. 1-16.

* cited by examiner

EARTH SURVEYING FOR IMPROVED DRILLING APPLICATIONS

CROSS-REFERENCE TO RELATED APPLICATIONS

This application claims benefit of priority of U.S. Provisional Patent Application No. 61/828,584 filed May 29, 2013 and entitled "EARTH SURVEYING FOR IMPROVED DRILLING APPLICATIONS," which is hereby incorporated by reference.

BACKGROUND

Wellbore position accuracy ensures successful drilling at a drilling site to a geological target, such as an underground reservoir of fluids including oil. Magnetic surveying of the area near the drilling site may improve an operator's ability to safely reach the geological target. One conventional technique is to use a model of Earth's magnetic field to calculate wellbore position. For example, the International Geomagnetic Reference Field (IGRF) has been used as magnetic models. However, these magnetic models are not accurate enough to provide detailed magnetic information for a particular localized area near a drilling site. For example, in the presence of solar activity, these geomagnetic models are unable to provide accurate localized magnetic field values around the world.

SUMMARY

In some embodiments, localized magnetic field measurements may be obtained near a drilling site, or other location, from a marine vehicle configured with a magnetic measurement device. In some embodiments, the marine vehicle may be a small, automated, unmanned robot with towed or hull-mounted sensors, including magnetic measurement devices. In one embodiment, the magnetic measurement device is attached to a tow wire and towed behind the marine vehicle. The marine vehicle may be programmed with a grid pattern to measure near a drilling site. When tracing the grid pattern, the marine vehicle may transmit magnetic measurements to another location, such as a magnetic observatory. In some embodiments, the magnetic measurements may be obtained in real-time (or near-real time) and utilized in modeling with a network of magnetic observatories and forward surface measurement to extend the range from one magnetic observatory, such as the nearest observatory or observatories, to the area of interest.

In one embodiment, a method may include receiving a magnetic field for a location from a vehicle at the location. The method may also include calculating a localized magnetic disturbance based, at least in part, on the received magnetic field. The method may further include calculating a wellbore position based, at least in part, on the calculated localized magnetic disturbance.

In another embodiment, an apparatus may include a marine vehicle. The apparatus may also include a magnetic measurement device attached to the marine vehicle. The apparatus may further include a processing system attached to the marine vehicle, the processing system configured to receive magnetic measurements from the magnetic measurement device and to transmit the magnetic measurements to a magnetic observatory.

In a further embodiment, a system may include a network of magnetic observatories. The system may also include at least one marine vehicle having a magnetic measurement device. The system may further include a processing station configured to receive magnetic measurements from the network of magnetic observatories and the at least one marine vehicle. The processing system may include a memory for storing the received magnetic measurements and a processor coupled to the memory. The processor may be configured to perform the steps of processing the received magnetic measurements and calculating a localized disturbance field in an area local to a magnetic measurement obtained by the at least one marine vehicle.

The foregoing has outlined rather broadly certain features and technical advantages of some embodiments of the disclosure in order that the detailed description that follows may be better understood. Additional features and advantages will be described hereinafter that form the subject of the claims. It should be appreciated by those having ordinary skill in the art that the specific embodiments disclosed may be readily utilized as a basis for modifying or designing other structures for carrying out the same or similar purposes. It should also be realized that such equivalent constructions do not depart from the spirit and scope of the invention as set forth in the appended claims. The novel features that are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the disclosure.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
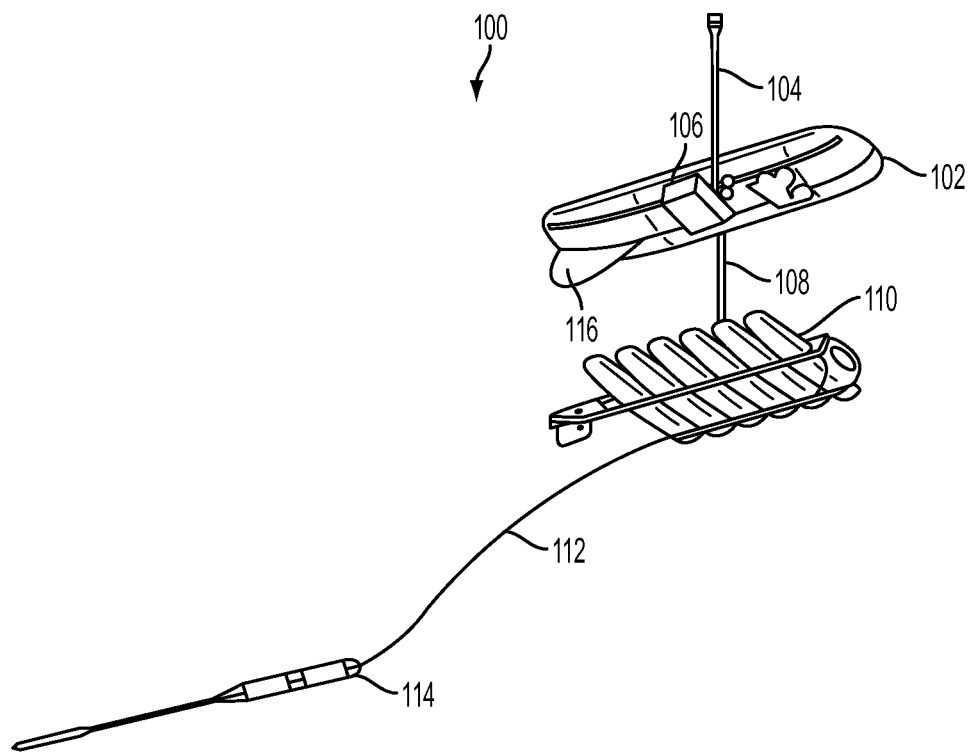
FIG. 1 is a perspective view of a marine vehicle with a towed magnetic measurement device according to one embodiment of the disclosure.

FIG. 1 is a perspective view of a marine vehicle with a towed magnetic measurement device according to one embodiment of the disclosure. A marine vehicle 100 may include a hull 102, a mast assembly 104, and a payload section 106. The payload section 106 may include, for example, a processing system coupled to an antenna on the mast assembly 104. A sub 110 may be attached to the hull 102 by an umbilical cord 108. The umbilical cord 108 may include cables to facilitate power transmission and communications between the processing system in the payload section 106 with electronic devices on the sub 110. A magnetic measurement device 114, such as a magnetometer, may be attached to the sub 110 by a tow wire 112. The magnetic measurement device 114 may also be directly attached to the hull 102 by a tow wire or mounted to the hull 102. The magnetic measurement device 114 may include magnetometers for scientific seaborne applications, bi-axial horizontal and/or vertical magnetometer systems, and/or automated true-north tri-axial magnetometer systems. The tow wire 112 may likewise facilitate power transmission and communications between the processing system in the payload section 106 and the magnetic measurement device 114. The marine vehicle 100 may have a magnetic signature that has a negligible effect on magnetic measurements obtained by the magnetic measurement device 114. In one embodiment, the marine vehicle 100 may be constructed entirely of non-magnetic materials.

The hull 102 may include solar panels (not shown) for generating power and a battery (not shown) in the payload section 106 for storing power from the solar panels, to allow twenty-four hour operation of the marine vehicle 100. The solar panels and battery may be configured to keep the marine vehicle 100 in operation for approximately two to three weeks, or longer.

A rudder 116 on the hull 102 may be controlled by the processing system to navigate the marine vehicle 100 near a drilling site for obtaining magnetic measurements of a localized magnetic disturbance field. For example, the processing system may control the rudder 116 to navigate the marine vehicle 100 in a grid search pattern around the drilling site. In another example, the processing system may receive commands from a remote location, such as the drilling site or magnetic observatory, instructing the marine vehicle to proceed to a particular destination and control the rudder 116 appropriately. The payload section 106 may be fitted with a global positioning system (GPS) receiver to provide accurate or improved location information to the processing system.

The processing system may obtain magnetic field measurements from the magnetic measurement device 114 and store or transmit the magnetic field measurements. The magnetic field measurements may be tagged with location information from the GPS receiver. If the measurements are stored by the processing system, the marine vehicle 100 may later be retrieved and the data downloaded from a memory of the processing system. If the measurements are transmitted, the processing system may include a wireless transmitter configured to transmit the magnetic measurements to a remote location, such as to a nearby magnetic observatory or the drilling site.

The payload section 106 may also be loaded with additional sensor devices to provide a suite of one or more services including, but not limited to, metrological, oceanographic, bathymetric, deep water data harvesting from subsea structures and seabeds, hydrocarbon seep mapping, turbidity measurements, marine mammal monitoring, source signature processing and water column profiling. In some embodiments, magnetic surveying may be performed in combination with a geophysical survey.

Figure 2:
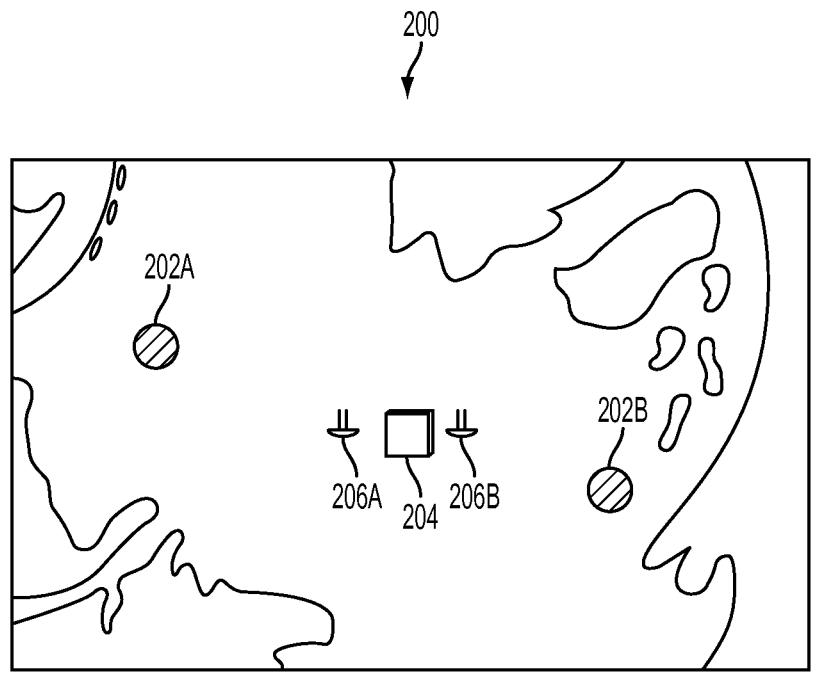
FIG. 2 is a map illustrating a system of magnetic observatories and marine vehicles for supporting a drilling site according to one embodiment of the disclosure.

The marine vehicle of FIG. 1 may be implemented in a system for measuring magnetic fields near a drilling site. FIG. 2 is a map illustrating a system of magnetic observatories and marine vehicles for supporting a drilling site according to one embodiment of the disclosure. A system 200 may include a network of magnetic observatories 202A, 202B near a drilling site 204. A fleet of marine vehicles 206A, 206B may also be deployed near the drilling site 204. The magnetic observatories 202A may obtain general magnetic measurements for the area near the drilling site 204, such as by consulting magnetic models and/or other data available. The marine vehicles 206A, 206B may be deployed near the drilling site 204 to obtain localized magnetic measurements near the drilling site 204 to improve the accuracy of calculated magnetic fields at the drilling site 204, and consequently to improve the accuracy of wellbore positioning at the drilling site 204.

The marine vehicles 206A, 206B may transmit magnetic measurements to a processing station at the magnetic observatories 202A, 202B, or to another facility, such as a processing system at the drilling site 204. When the magnetic measurements are received, the wellbore position may be re-calculated and operations at the drilling site 204 adjusted based on the new calculation. One method utilizing the localized magnetic measurements is described with reference to FIG. 3 below.

Figure 3:
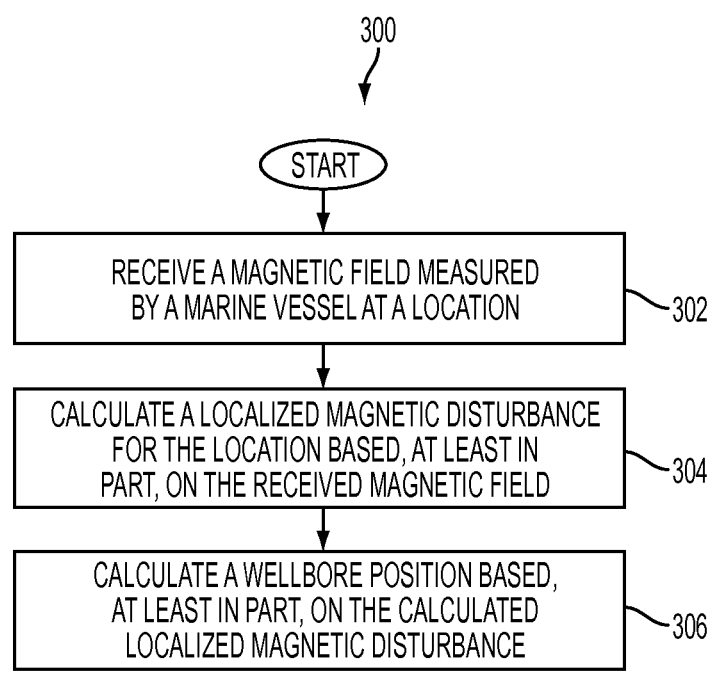
FIG. 3 is a flow chart illustrating a method of calculating a wellbore position according to one embodiment of the disclosure.

FIG. 3 is a flow chart illustrating a method of calculating a wellbore position according to one embodiment of the disclosure. A method 300 begins at block 302 with receiving a magnetic field measured by a marine vehicle at a location, such as a location near a drilling site or a potential wellbore. According to one embodiment, a marine vehicle, such as that of FIG. 1, may acquire data in one second intervals utilizing GPS triggers and transmit them to a processing station at one minute intervals. The magnetic measurements received by the processing station may be made available for remote viewing or access, which in some embodiments may be through a web interface.

At block 304, a localized magnetic disturbance for the location is calculated based, at least in part, on the received magnetic field measurements of block 302. A total magnetic field (TMI), which is measured by the marine vessel at the location, may include three components, a main field, $B_M$, a crustal field, $B_C$, and a local disturbance field, $B_D$. The main field, $B_M$, and the crustal field, $B_C$, may be modeled for the location or be derived from the continuous monitoring at the location by fitting the spline with knot separations, where the spline is the sum of the $B_M$ and $B_C$. Thus, the difference between the measured magnetic field at the location and the sum of the main field, $B_M$, and the crustal field, $B_C$, is the local disturbance field, $B_D$. The disturbance field, $B_D$, may be the result of, for example, solar flares that alter the Earth's magnetic fields.

At block 306, a wellbore position may be calculated based, at least in part, on the calculated localized magnetic disturbance field, $B_D$, of block 304. For example, the total magnetic field (TMI), which includes the calculated localized magnetic disturbance field, $B_D$, may be used to calculate a declination value, which is the difference between magnetic north and true north. The declination value may be used by operators of a drilling site to direct the drilling operations to reach the underground reservoir.

The use of a marine vehicle for obtaining localized magnetic measurements near a drilling site or other location may reduce the risk and high fixed-asset investment in obtaining determining wellbore positions. The marine vehicle may operate unmanned in locations hostile to human life or difficult for humans to access. For example, the unmanned marine vehicle reduces or eliminates crew exposure to piracy or need for search and rescue (SAR) assets, when compared to traditional seaborne or airborne magnetic acquisition operations.

The method described with reference to FIG. 3 may be carried out by a processing station, located at the drilling site, the magnetic observatory, or another location; or via distributed computing systems situated at multiple locations. The processing station may include a memory for storing received magnetic measurements and other data and may include a processor coupled to the memory for executing the processing of the received magnetic measurements.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain of its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   receiving a magnetic field measurement for a location from a vehicle at the location, wherein the magnetic field corresponds to measurements below a surface level;
   monitoring a magnetic field at the location to determine a crustal field at the location;
   calculating a localized magnetic disturbance related to solar activity and independent of a main field and independent of the crustal field based, at least in part, on the received magnetic field measurement by subtracting the magnetic field measurement from the crustal field; and
   calculating a wellbore position based, at least in part, on the calculated localized magnetic disturbance.

2. The method of claim 1, further comprising receiving a plurality of measured magnetic field values for a plurality of locations arranged along a grid pattern.

3. The method of claim 1, in which the step of calculating a localized magnetic disturbance comprises:
   calculating a main field; and
   calculating the localized magnetic disturbance based on the main field and the crustal field.

4. The method of claim 1, further comprising calculating a declination based, at least in part, on the calculated localized magnetic disturbance.

5. The method of claim 1, in which the step of receiving the magnetic field measurement comprises receiving the magnetic field measurement in real-time.

6. An apparatus, comprising:
   a marine vehicle;
   a magnetic measurement device, the magnetic measurement device configured to obtain magnetic measurements below a surface level for drilling calculations, the magnetic measurement device attached to the marine vehicle, and wherein the marine vehicle is configured to monitor a magnetic field at a location to determine a crustal field at the location;
   a processing system attached to the marine vehicle, the processing system configured to receive magnetic measurements from the magnetic measurement device and to transmit the magnetic measurements to a magnetic observatory for calculating a wellbore position based, at least in part, on a calculated localized magnetic disturbance related to solar activity and independent of a main field and independent of the crustal field, wherein the calculated localized magnetic disturbance is calculated by subtracting a magnetic field measurement of the magnetic measurements from the determined crustal field.

7. The apparatus of claim 6, in which the magnetic measurement device is attached to the marine vehicle by a tow wire.

8. The apparatus of claim 6, in which the marine vehicle comprises a non-magnetic material.

9. The apparatus of claim 6, further comprising at least one of a metrological, an oceanographic, and a bathymetric sensor.

10. The apparatus of claim 6, further comprising a guidance system configured to propel the marine vehicle through a grid pattern.

11. The apparatus of claim 6, in which the processing system is configured to transmit the magnetic measurements in real-time.

12. A system, comprising:
   at least one marine vehicle having a magnetic measurement device for obtaining magnetic measurements below a surface level for drilling calculations; and
   a processing station configured to receive magnetic measurements from the at least one marine vehicle, the processing station comprising:
      a memory for storing the received magnetic measurements; and
      a processor, in which the processor is configured to perform the steps of:
         processing the received magnetic measurements;
         determining a crustal field based on the received magnetic measurements;
         calculating a localized magnetic disturbance field in an area local to a magnetic measurement related to solar activity and independent of a main field and independent of the crustal field by subtracting one of the received magnetic measurements from the determined crustal field; and
         calculating a wellbore position based, at least in part, on the calculated localized magnetic disturbance field.

13. The system of claim 12, in which the magnetic measurement device is attached to the at least one marine vehicle by a tow wire.

14. The system of claim 12, in which the at least one marine vehicle further comprises a guidance system configured to propel the marine vehicle through a grid pattern.

15. The system of claim 12, in which the at least one marine vehicle further comprises at least one of a metrological, an oceanographic, and a bathymetric sensor.

16. The system of claim 12, in which the at least one marine vehicle is configured to transmit the magnetic measurements in real-time.

17. The system of claim 12, in which the processor is further configured to perform the steps of:
   calculating a main field; and
   calculating the localized magnetic disturbance based on the main field and the crustal field.

18. The method of claim 1, wherein the step of monitoring a magnetic field at the location to determine a crustal field at the location comprises monitoring the location by fitting a spline with knot separations, wherein the spline is the sum of a main field and the crustal field.

19. The system of claim 12, wherein the step of determining the crustal field comprises monitoring the location by fitting a spline with knot separations, wherein the spline is the sum of a main field and the crustal field.

* * * * *